United States Patent [19]

Masuda

[11] Patent Number: 4,501,823
[45] Date of Patent: Feb. 26, 1985

[54] CATALYST FOR REFORMING OF METHANOL AND PROCESS OF PREPARING SAME

[75] Inventor: Koji Masuda, Yokosuka, Japan

[73] Assignee: Nissan Motor Company, Limited, Yokohama, Japan

[21] Appl. No.: 567,181

[22] Filed: Dec. 30, 1983

[30] Foreign Application Priority Data

Apr. 28, 1983 [JP] Japan .................................. 58-73905

[51] Int. Cl.$^3$ .................... B01J 21/04; B01J 21/06; B01J 23/10; B01J 23/42; B01J 23/44
[52] U.S. Cl. ..................................... 502/304; 252/373
[58] Field of Search ...................... 502/304; 252/373; 423/415 A

[56] References Cited

U.S. PATENT DOCUMENTS 4,294,726 10/1981 Bozon et al. ........................ 502/304
4,369,132 1/1983 Kinoshita et al. ............... 502/304 X
4,426,319 1/1984 Blanchard et al. ............. 502/302 X

FOREIGN PATENT DOCUMENTS 57-7254 1/1982 Japan .
57-7255 1/1982 Japan .

Primary Examiner—W. J. Shine
Attorney, Agent, or Firm—Schwartz, Jeffery, Schwaab, Mack, Blumenthal & Koch

[57] ABSTRACT

A catalyst for reforming of methanol to hydrogen and carbon monoxide, which is high in activity, selectivity and durability. The catalyst utilizes a granular or monolithic carrier of which the principal material is active alumina. First the carrier is coated with a mixture of cerium oxide and zirconium oxide, preferably by pyrolysis of a cerium salt and a zirconium salt applied to the carrier as a mixed solution. Then either Pt or Pd, or both, is deposited on the coated carrier preferably by pyrolysis of a platinum or palladium compound applied to the carrier as a solution. After that the nearly finished catalyst is treated with a solution of a reducing agent such as sodium boron hydride or hydrazine to render the deposited Pt and/or Pd substantially completely reduced.

17 Claims, 2 Drawing Figures

CATALYST FOR REFORMING OF METHANOL AND PROCESS OF PREPARING SAME

BACKGROUND OF THE INVENTION

This invention relates to an improved catalyst for the reforming of methanol to hydrogen and carbon monoxide and a process of preparing the same.

In conventional catalysts for the reforming of methanol to hydrogen and carbon monoxide, an active alumina base inorganic material is usually used as the material of the catalyst support or carrier. As for the catalytic substance to be deposited on the carrier it is popular to employ a metal or metals of the platinum group, and it is also known to use a base metal or base metals such as copper, chromium, nickel, manganese and/or zirconium instead of, or jointly with, the metal(s) of the platinum group. In such conventional catalysts, platinum, rhodium and palladium have been taken as particularly advantageous in terms of both the conversion efficiency or catalytic activity and the durability in vaporized and heated methanol.

From a practical point of view, however, the conventional catalysts are still unsatisfactory, especially when used in internal combustion engine systems using the reformed gas produced from methanol, in their activity, durability and selectivity for the intended decomposition reaction of methanol to hydrogen and carbon monoxide even though metals of the platinum group are used as the catalytic substance. Therefore, there is a trend toward the use of a considerably large amount of noble metal in producing the catalysts of the above described type with a view to improving the activity and durability of the catalysts, particularly the activity at relatively low temperatures and durability under practical reforming conditions or adaptability to the reforming processes in which vaporized methanol is passed through a catalyst column or bed at a relatively high space velocity. However, such compensative measures are of limited effect and inevitably lead to a considerable rise in the production cost of the catalysts, which offers a serious problem to the reforming of methanol on the commercial basis.

SUMMARY OF THE INVENTION

It is an object of the present invention to provide an improved catalyst for the reforming of methanol to hydrogen and carbon monoxide, which catalyst contains only a relatively small amount of noble metal but is sufficiently high in its activity and selectivity for the intended reforming reaction and also in durability even when used under relatively severe reaction conditions.

It is another object of the invention to provide a process of preparing a catalyst according to the invention.

A catalyst according to the invention utilizes a carrier which comprises active alumina as a principal material thereof. As the primary feature of the invention, the carrier is coated with a mixture of cerium oxide and zirconium oxide. The catalyst comprises at least one catalytic metal selected from platinum and palladium, which is deposited on the coated carrier and treated with a reducing agent after the deposition on the carrier.

Preferably, the quantities of cerium oxide and zirconium oxide coated on the carrier are such that Ce in the mixed oxide coating amounts to 0.1 to 15% by weight of the carrier and Zr amounts to 0.1 to 10% by weight of the carrier. Also preferably, the total content of Pt and/or Pd in the catalyst is in the range from 0.1 to 1.0% by weight.

A catalyst according to the invention is very high in its activity and selectivity for the decomposition of methanol to hydrogen and carbon monoxide even at relatively low temperatures and exhibits good durability under practical reforming reaction conditions, so that this catalyst is practicable in internal combustion engine systems, which may be installed on vehicles such as automobiles, using the reformed gas obtained from methanol.

According to the invention, such an improved catalyst is prepared by a process comprising the following steps. (A) First the carrier is coated with a mixture of cerium oxide and zirconium oxide. (B) Next the coated carrier is impregnated with an aqueous solution of a thermally decomposable compound of platinum and/or a thermally decomposable compound of palladium. (C) After adequate drying the carrier impregnated with the solution is baked to decompose the metal compound(s) adhering to the carrier to thereby deposit platinum and/or palladium on the carrier. (D) The carrier after the baking step (C) is immersed in and treated with a solution of a reducing agent so that platinum and/or palladium deposited on the carrier is substantially completely reduced.

Preferably the initial coating step is performed by first impregnating the carrier with an aqueous mixed solution of a cerium salt and a zirconium salt and then baking the carrier impregnated with the solution so as to form cerium oxide and zirconium oxide by pyrolysis of the metal salts. As to the final reduction treatment, it is preferred to use either sodium boron hydride or hydrazine as the reducing agent.

DESCRIPTION OF THE PREFERRED EMBODIMENTS

Figure 1:
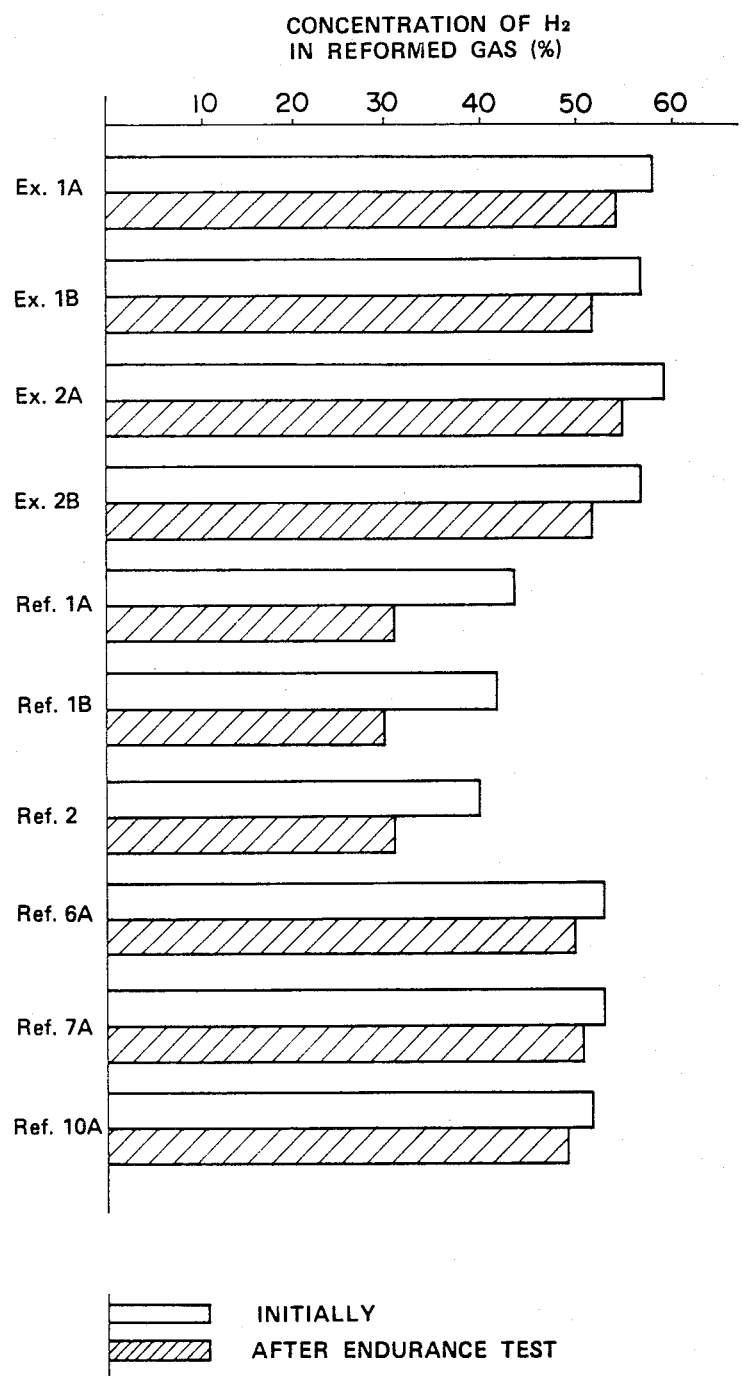
FIG. 1 is a bar graph showing the results of tests for evaluation of the activity and endurance of some examples of the catalyst according to the invention together with the results of the same tests made on some reference catalysts for comparison.

In the present invention it is usual to use a catalyst carrier in the form of granules or pellets, but is is also possible to use a monolithic carrier having a porous or honeycomb structure. The carrier can be selected from conventional ones of inorganic materials, but it is a requirement that the carrier be made of active alumina, which is typified by $\gamma$-$Al_2O_3$, either in its entirety or at least in its surface regions where the catalytic substances are to be deposited. It is preferred to use a granular carrier which consists essentially of active alumina.

In preparing a catalyst according to the invention, substantially the first step is to form a mixed oxide coating layer which consists of cerium oxide and zirconium oxide on the carrier surface. The mixed oxide coating layer can be formed by thermal decomposition of a suitable cerium compound and a suitable zirconium compound on the carrier surface. As a practical method, first the carrier is immersed in an aqueous mixed solution of a cerium salt such as cerium nitrate and a zirconium salt such as zirconyl nitrate so as to be well impregnated with the solution. The wet carrier is dried to reduce the moisture content to a suitable level and then baked in an air stream at a temperature in the range from about 450° C. to about 600° C., preferably for 1–3 hr. The amounts of cerium oxide and zirconium oxide in the thus treated carrier can be controlled by adjusting the concentrations of the cerium and zirconium salts in the mixed solution.

As to the amounts of cerium oxide and zirconium oxide in the oxide-coated carrier, it is preferred that the coated carrier contains 0.1 to 15% by weight of Ce (existing as $CeO_2$) and 0.1 to 10% by weight of Zr (existing as $ZrO_2$). When the total content of Ce and Zr in the oxide-coated carrier is less than 0.2% by weight, the effects of the joint use of cerium oxide and zirconium oxide on the activity and endurance of a catalyst prepared by using the oxide-coated carrier will be almost inappreciable. When the amount of the noble metal (platinum and/or palladium) deposited on the oxide-coated carrier is in a predetermined suitable range, the effects of the presence of cerium oxide and zirconium oxide on the carrier surface become practically maximal while the content of Ce (existing as oxide) in the oxide-coated carrier is below 15 wt% and the content of Zr (existing as oxide) is below 10 wt%. That is, even if the content of Ce in the coated carrier is increased beyond 15 wt% or the content of Zr beyond 10 wt%, the effects of the mixed oxide coating no longer significantly augment.

Next, either platinum or palladium, or both, employed as the primary catalytic component is deposited on the carrier which is coated with cerium oxide and zirconium oxide. This step can be accomplished by a well known thermal decomposition method. The carrier having the mixed oxide coating is immersed in an aqueous solution of a suitable platinum compound such as chloroplatinic acid or a suitable palladium compound such as palladium chloride. In the case of depositing both platinum and palladium use is made of a mixed solution of a platinum compound and a palladium compound. The carrier impregnated with the noble metal compound solution is dried to reduce the moisture content to a suitable level and then baked usually at a temperature in the range from about 500° C. to about 600° C. for about 1–3 hr to achieve thermal decomposition of the noble metal compound to form elemental platinum or palladium. It is preferred to perform the baking in a steam atmosphere, though it is also possible to perform the baking either in air or in hydrogen gas. It is preferred that the total content of Pt and/or Pd in the catalyst is in the range from 0.1 to 1.0% by weight. When the total content of Pt and/or Pd is less than 0.1 wt% the activity of the catalyst remains insufficient for efficient reforming of methanol to hydrogen and carbon monoxide. However, it is uneconomical to increase the total content of Pt and/or Pd beyond 1.0 wt%, and loss of the noble metal(s) during preparation of the catalyst becomes significant when it is intended to deposit more than 1 wt% of the noble metal(s) on the carrier.

The product of the above described noble metal deposition process serves as a catalyst for some purposes. In the present invention, however, the noble metal(s) deposited on the oxide-coated carrier is subjected to a liquid phase reduction treatment, i.e. treatment with an aqueous solution of a suitable reducing agent. The reducing agent can be selected from either inorganic reducing agents such as sodium boron hydride, sodium sulfide and ammonium sulfide or organic reducing agents such as hydrazine, formaldehyde, pyrogallol, hydroquinone, formic acid and oxalic acid. Among inorganic reducing agents the most preferred is sodium boron hydride, and among organic reducing agents the most preferred is hydrazine. The liquid phase reduction treatment is made by immersing the nearly completed catalyst in an aqueous solution of a selected reducing agent and keeping the catalyst in the solution for a relatively short period of time, e.g. several minutes, with adequate stirring. After this treatment that catalyst is washed with water and dried. It is preferred that the concentration of the reducing agent in the aqueous solution is 0.5% by weight or above in the case of sodium boron hydride and 1.0% by weight or above in the case of hydrazine, but in either case it is unfavorable that the concentration of the reducing agent exceeds 5% by weight because the use of such a high concentration solution is liable to cause loss of a portion of the noble metal(s) in the catalyst under the treatment. By this treatment platinum and/or palladium deposited on the oxide-coated carrier undergoes substantially complete reduction and becomes very pure and fine in its crystalline particles.

The invention will further be illustrated by the following nonlimitative examples.

EXAMPLE 1

In this example, and also in the succeeding examples, use was made of a granular catalyst carrier which was principally of γ-alumina and consisted of grains about 1–3 mm in diameter.

First the alumina grains were immersed in an aqueous mixed solution of cerium nitrate and zirconyl nitrate (zirconium oxynitrate). The alumina grains impregnated with the solution were drained, dried at about 200° C. and then baked in an air stream at 600° C. for 1 hr to cause cerium nitrate and zirconyl nitrate adhering to the alumina grains to decompose and turn into cerium oxide and zirconium oxide, respectively. The concentrations of the cerium and zirconyl nitrates dissolved in the aforementioned solution were such that the content of Ce (existing as $CeO_2$) in the baked alumina grains became 1% by weight and the content of Zr (existing as $ZrO_2$) became 1% by weight.

As Example 1A, a portion of the catalyst carrier coated with cerium oxide and zirconium oxide was kept immersed in an aqueous solution of chloroplatinic acid with adequate stirring. The wet carrier was drained and then dried in a hot air oven at 200° C. until the moisture content became below 10% by weight. The thus treated catalyst carrier was baked in a steam stream at 550° C. for 90 min to cause deposition of metallic platinum on the oxide-coated carrier be decomposition of chloroplatinic acid. After the baking process the alumina grains carrying platinum deposited on the mixed oxide coating were kept immersed in 0.5 wt% aqueous solution of sodium boron hydride (abbreviated to SBH) for several minutes at room temperature. After this reduction treatment the alumina grains were washed with water and dried to complete a process of preparing a catalyst according to the invention. The concentration of the aforementioned chloroplatinic acid solution had been adjusted such that the content of Pt in the catalyst of Example 1A was 0.38% by weight.

As Example 1B, another portion of the catalyst carrier coated with cerium oxide and zirconium oxide was immersed in an aqueous solution of palladium chloride, which was used in place of the chloroplatinic acid solution in Example 1A. After that, the process of drying, baking and treating with SBH solution described in Example 1A was performed under the same operation conditions. In this case the baking operation resulted in the deposition of metallic palladium on the oxide-coated alumina grains, and the content of Pd in the catalyst prepared as Example 1B was 0.38% by weight.

EVALUATION TESTS

The activity of every catalyst prepared in the herein described examples was evaluated by the following test.

A catalyst bed produced by using 10 ml of the catalyst for testing in fresh state was maintained at 300° C., and vaporized methanol (industrial 100% methanol) was passed through the catalyst bed at a volume hourly space velocity of 2000 $hr^{-1}$. In a short time the gas stream at a section immediately downstream of the catalyst bed was sampled to measure the concentration of $H_2$ in the sampled gas by gas chromatography as an indication of the degree of decomposition of methanol.

The endurance of each catalyst was evaluated by modifying the above described test method. In this case a catalyst bed produced by using 20 ml of the catalyst was maintained at 400° C., and vaporized methanol was passed through the catalyst bed for a total period of 200 hr at a constant volume hourly space velocity of 2000 $hr^{-1}$. After that the temperature of the catalyst bed was lowered to 300° C., and the concentration of $H_2$ in the gas sampled at the aforementioned section was measured.

The results of these tests on the catalysts of Example 1A and 1B will be shown hereinafter in table form together with the corresponding data on other catalysts which are described below.

EXAMPLE 2

The mixed nitrate solution used in Example 1 was modified by increasing the concentration of cerium nitrate. Except this modification, every operation described in Example 1 was carried out in the same manner. In the oxide-coated alumina grains prepared in this example the content of Ce (existing as oxide) was 2% by weight, and the content of Zr (existing as oxide) was 1% by weight. The catalyst prepared as Example 2A contained 0.38% by weight of Pt and the catalyst of Example 2B 0.38% by weight of Pd.

EXAMPLE 3

Example 2 was modified only in that the concentration of cerium nitrate in the mixed nitrate solution was further increased such that the content of Ce (existing as oxide) in the oxide-coated alumina grains became 3% by weight. The catalysts prepared as Examples 3A and 3B contained 0.38 wt% of Pt and 0.38 wt% of Pd, respectively.

EXAMPLE 4

As the sole difference from Example 1, the concentration of zirconyl nitrate in the mixed nitrate solution was increased such that the content of Zr (existing as oxide) in the oxide-coated alumina grains became 2% by weight. The catalysts prepared as Examples 4A and 4B contained Pt and Pd, respectively.

EXAMPLE 5

Example 4 was modified only in that the concentration of zirconyl nitrate in the solution was further increased such that the content of Zr (existing as oxide) in the oxide-coated alumina grains became 3% by weight. The catalysts of Examples 5A and 5B contained Pt and Pd, respectively.

EXAMPLE 6

As the sole difference from Example 1, use was made of 1.0 wt% aqueous solution of hydrazine in the reduction treatment in place of the SBH solution. The catalyst of Example 6A contained 0.38 wt% of Pt, and the catalyst of Example 6B contained 0.38 wt% of Pd.

For comparison, some kinds of catalysts not in accordance with the invention were prepared as described below.

REFERENCE 1

The granular catalyst carrier of γ-alumina mentioned in Example 1 was used without forming cerium oxide or zirconium oxide thereon.

As Reference 1A, a catalyst was prepared by depositing platinum on the alumina grains by the same method as in Example 1A. In this case the reduction treatment with SBH solution was omitted. This catalyst contained 0.38 wt% of Pt.

As Reference 1B, another catalyst was prepared by depositing palladium on the alumina grains by the same method as in Example 1B, omitting the reduction treatment with SBH solution. This catalyst contained 0.38 wt% of Pd.

REFERENCE 2

In this case copper was employed as a catalytic metal in place of platinum or palladium. The alumina grains having neither cerium oxide nor zirconium oxide thereon were impregnated with an aqueous solution of copper nitrate, and then the drying and baking operations described in Example 1A were carried out under the same conditions. The reduction treatment with SBH solution was omitted. The catalyst of Reference 2 contained 9.0 wt% of Cu.

REFERENCE 3

As Reference 3A, a catalyst prepared in accordance with Reference 1A was treated with the SBH solution used in Example 1. As Reference 3B, a catalyst prepared in accordance with Reference 1B was treated with the same SBH solution.

REFERENCE 4

The alumina grains mentioned in Example 1 were treated with an aqueous solution of cerium nitrate. After drying the treated alumina grains were baked in an air stream at 600° C. for 1 hr to form cerium oxide on the alumina grains. The content of Ce (existing as oxide) in the baked alumina grains was 1% by weight.

Using the cerium oxide coated alumina grains a catalyst containing Pt (Reference 4A) was prepared by the same process as in the case of Reference 3A, and, using the same alumina grains, a catalyst containing Pd (Reference 4B) was prepared by the same process as in the case of Reference 3B.

REFERENCE 5

Using a zirconyl nitrate solution in place of the cerium nitrate solution in Reference 4, zirconium oxide was formed on the alumina grains mentioned in Example 1 by the same baking process as in Reference 4. The content of Zr (existing as oxide) was 1% by weight.

Using the zirconium oxide coated alumina grains, two kinds of catalysts as References 5A and 5B containing Pt and Pd, respectively, were prepared by the same processes as in Reference 3.

REFERENCES 6–9

The catalysts of References 6A, 6B and References 8A, 8B were prepared generally similarly to the catalyst of Reference 4A or 4B but by increasing the content of Ce (existing as oxide) in the catalyst carrier to 2 wt% or to 3 wt%. The catalysts of References 7A, 7B and References 9A, 9B were prepared generally similarly to the catalyst of Reference 5A or 5B but by increasing the content of Zr (existing as oxide) in the carrier to 2 wt% or to 3 wt%.

REFERENCE 10

The catalysts of References 10A and 10B were prepared generally in accordance with Reference 4, but by using 1.0 wt% aqueous solution of hydrazine in the reduction treatment in place of the SBH solution in Reference 4.

REFERENCE 11

The catalysts of References 11A and 11B were prepared generally in accordance with Reference 5, but by using the aforementioned hydrazine solution in the reduction treatment.

The catalysts of References 1–11 were also subjected to the evaluation tests described hereinbefore. Table 1 shows the results of the evaluation tests, and FIG. 1 graphically shows the results of the evaluation tests on the catalysts of Examples 1 and 2 and some representatives of the catalyts of References 1–11.

TABLE 1

| Catalyst | Catalytic Metal | Promoter Metal (used as oxide) (content, wt %) | Reducing Agent | Concentration of $H_2$ in Sampled Gas (%) initially | after 200 hr |
|---|---|---|---|---|---|
| Ex. 1A | Pt | Ce(1), Zr(1) | SBH | 58 | 54 |
| Ex. 1B | Pd | Ce(1), Zr(1) | SBH | 57 | 52 |
| Ex. 2A | Pt | Ce(2), Zr(1) | SBH | 59 | 55 |
| Ex. 2B | Pd | Ce(2), Zr(1) | SBH | 57 | 52 |
| Ex. 3A | Pt | Ce(3), Zr(1) | SBH | 59 | 55 |
| Ex. 3B | Pd | Ce(3), Zr(1) | SBH | 57 | 52 |
| Ex. 4A | Pt | Ce(1), Zr(2) | SBH | 59 | 55 |
| Ex. 4B | Pd | Ce(1), Zr(2) | SBH | 58 | 52 |
| Ex. 5A | Pt | Ce(1), Zr(3) | SBH | 59 | 56 |
| Ex. 5B | Pd | Ce(1), Zr(3) | SBH | 58 | 53 |
| Ex. 6A | Pt | Ce(1), Zr(1) | $N_2H_4$ | 58 | 51 |
| Ex. 6B | Pd | Ce(1), Zr(1) | $N_2H_4$ | 57 | 50 |
| Ref. 1A | Pt | — | — | 43 | 31 |
| Ref. 1B | Pd | — | — | 42 | 30 |
| Ref. 2 | Cu | — | — | 40 | 31 |
| Ref. 3A | Pt | — | SBH | 46 | 35 |
| Ref. 3B | Pd | — | SBH | 45 | 33 |
| Ref. 4A | Pt | Ce(1) | SBH | 53 | 50 |
| Ref. 4B | Pd | Ce(1) | SBH | 52 | 49 |
| Ref. 5A | Pt | Zr(1) | SBH | 53 | 51 |
| Ref. 5B | Pd | Zr(1) | SBH | 52 | 48 |
| Ref. 6A | Pt | Ce(2) | SBH | 53 | 50 |
| Ref. 6B | Pd | Ce(2) | SBH | 52 | 49 |
| Ref. 7A | Pt | Zr(2) | SBH | 53 | 51 |
| Ref. 7B | Pd | Zr(2) | SBH | 52 | 49 |
| Ref. 8A | Pt | Ce(3) | SBH | 53 | 50 |
| Ref. 8B | Pd | Ce(3) | SBH | 52 | 49 |
| Ref. 9A | Pt | Zr(3) | SBH | 52 | 49 |
| Ref. 9B | Pd | Zr(3) | SBH | 52 | 49 |
| Ref. 10A | Pt | Ce(1) | $N_2H_4$ | 52 | 49 |
| Ref. 10B | Pd | Ce(1) | $N_2H_4$ | 51 | 48 |
| Ref. 11A | Pt | Zr(1) | $N_2H_4$ | 52 | 49 |
| Ref. 11B | Pd | Zr(1) | $N_2H_4$ | 51 | 49 |

As can be seen in Table 1 and FIG. 1, the catalysts of the examples of the invention were remarkably higher in the catalytic activity on the reforming of methanol than the reference catalysts and exhibited better endurance. In FIG. 1, a comparison between the data on the catalysts of Examples 1A, 1B and the data on the catalysts of References 6A and 7A leads to a conclusion that the joint use of cerium oxide and zirconium oxide, i.e. the primary feature of the invention, is quite effective for enhancement of the activity of the catalyst.

In the following examples, the amount of cerium oxide or zirconium oxide in the binary oxide coating on the catalyst carrier was varied over a wide range. In other respects, the catalysts of these examples were prepared in accordance with Example 1A or 1B. The catalysts of Examples 7–13 were tested in the same manner as the catalysts of the foregoing examples.

EXAMPLES 7–9

As shown in Table 2, the content of Ce (existing as oxide) in the oxide coated alumina grains was increased to 10 wt% in Example 7, to 15 wt% in Example 8 and to 20 wt% in Example 9, while the content of Zr (existing as oxide) was constantly 1 wt%.

EXAMPLES 10–12

As shown in Table 2, the content of Zr (existing as oxide) in the oxide coated alumina grains was increased to 5 wt% in Example 10, to 10 wt% in Example 11 and to 15 wt% in Example 12, while the content of Ce (existing as oxide) was constantly 1 wt%.

EXAMPLE 13

Both cerium oxide and zirconium oxide were decreased such that the oxide coated alumina grains contained 0.1 wt% of Ce and 0.1 wt% of Zr.

TABLE 2

| Catalyst | Catalytic Metal | Promoter Metal (used as oxide) (content, wt %) | Reducing Agent | Concentration of $H_2$ in Sampled Gas (%) initially | after 200 hr |
|---|---|---|---|---|---|
| Ex. 1A | Pt | Ce(1), Zr(1) | SBH | 58 | 54 |
| Ex. 1B | Pd | Ce(1), Zr(1) | SBH | 57 | 52 |
| Ex. 7A | Pt | Ce(10), Zr(1) | SBH | 59 | 55 |
| Ex. 7B | Pd | Ce(10), Zr(1) | SBH | 58 | 54 |
| Ex. 8A | Pt | Ce(15), Zr(1) | SBH | 59 | 56 |
| Ex. 8B | Pd | Ce(15), Zr(1) | SBH | 58 | 54 |
| Ex. 9A | Pt | Ce(20), Zr(1) | SBH | 59 | 56 |
| Ex. 9B | Pd | Ce(20), Zr(1) | SBH | 58 | 54 |
| Ex. 10A | Pt | Ce(1), Zr(5) | SBH | 59 | 55 |
| Ex. 10B | Pd | Ce(1), Zr(5) | SBH | 58 | 54 |
| Ex. 11A | Pt | Ce(1), Zr(10) | SBH | 59 | 55 |
| Ex. 11B | Pd | Ce(1), Zr(10) | SBH | 58 | 54 |
| Ex. 12A | Pt | Ce(1), Zr(15) | SBH | 59 | 55 |
| Ex. 12B | Pd | Ce(1), Zr(15) | SBH | 58 | 54 |

TABLE 2-continued

| Catalyst | Catalytic Metal | Promoter Metal (used as oxide) (content, wt %) | Reducing Agent | Concentration of $H_2$ in Sampled Gas (%) initially | after 200 hr |
|---|---|---|---|---|---|
| Ex. 13 | Pt | Ce(0.1), Zr(0.1) | SBH | 55 | 45 |

Figure 2:
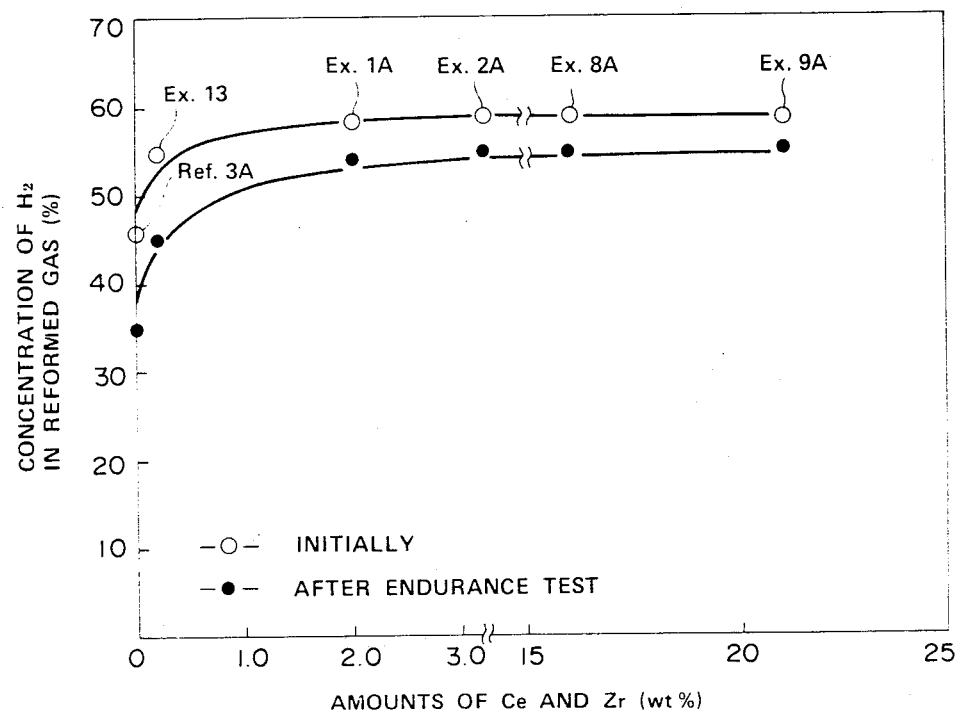
FIG. 2 is a graph showing the relationship between the total content of cerium and zirconium in the carrier of the catalyst according to the invention and the activity of the catalyst.

By using some of the data in Tables 1 and 2 with respect to the catalysts containing 0.38 wt% of Pt, FIG. 2 shows the relationship between the total content of Ce ($CeO_2$) and Zr ($ZrO_2$) in the catalyst carrier and the activity of the catalyst (represented by the $H_2$ concentration in the sampled gas). As will be understood from FIG. 2, the effect of jointly using $CeO_2$ and $ZrO_2$ remains insufficient when the total amount of Ce and Zr is less than 0.2 wt% of the carrier, but increasing the amount of Ce beyond 15 wt% no longer produces a corresponding effect.

What is claimed is:

1. A catalyst for the reforming of methanol to hydrogen and carbon monoxide, consisting essentially of:
   a carrier which comprises active alumina as a principal material thereof and is coated with a mixture consisting esssentially of cerium oxide and zirconium oxide; and
   at least one catalytic metal selected from the group consisting of platinum and palladium, which is deposited on said carrier.

2. A catalyst according to claim 1, wherein Ce in said cerium oxide amounts to 0.1 to 15% by weight of said carrier and Zr in said zirconium oxide amounts to 0.1 to 10% by weight of said carrier.

3. A catalyst according to claim 2, wherein the total content of said at least one catalytic metal in the catalyst is in the range from 0.1 to 1.0% by weight.

4. A catalyst according to claim 1, wherein said carrier is granular.

5. A catalyst according to claim 1, wherein said carrier is monolithic.

6. A process of preparing a catalyst for the reforming of methanol to hydrogen and carbon monoxide, the process consisting essentially of the steps of:
   (a) coating a carrier which comprises active alumina as a principal material thereof with a mixture consisting essentially of cerium oxide and zirconium oxide;
   (b) impregnating the coated carrier with an aqueous solution consisting essentially of at least one thermally decomposable compound of a catalytic metal selected from the group consisting of platinum compounds and palladium compounds;
   (c) after step (b), drying the carrier so as to reduce moisture content therein to a predetermined level;
   (d) baking the carrier impregnated with said solution in a steam atmosphere at a temperature between about 500° C. and 600° C. such that said compound adhering to the carrier is decomposed, thereby depositing at least one catalytic metal selected from the group consisting of platinum and palladium on the carrier; and
   (e) subjecting the carrier treated in step (d) to a reduction treatment which comprises immersing the carrier in a solution of a reducing agent, such that said catalytic metal deposited on the carrier is rendered substantially completely reduced.

7. A process according to claim 6, wherein step (a) is performed such that Ce in said cerium oxide amounts to about 0.1 to about 15% by weight of the carrier and Zr in said zirconium oxide amounts to about 0.1 to about 10% by weight of the carrier.

8. A process according to claim 7, wherein the step (a) comprises the impregnating said carrier with an aqueous mixed solution of a cerium salt and a zirconium salt and baking the carrier impregnated with said mixed solution.

9. A process according to claim 8, wherein said baking in step (a) is performed in an oxidizing atmosphere at a temperature in the range from about 450° C. to about 600° C.

10. A process according to claim 8, wherein said cerium salt is cerium nitrate and said zirconium salt is zirconium oxynitrate.

11. A process according to claim 8, wherein step (b) is performed such that the total content of said catalytic metal in the catalyst is in the range from 0.1 to 1.0% by weight.

12. A process according to claim 11, wherein said solution in step (b) is selected from the group consisting of an aqueous solution of chloroplatinic acid, an aqueous solution of palladium chloride and an aqueous mixed solution of chloroplatinic acid and palladium chloride.

13. A process according to claim 11, wherein said solution of said reducing agent is an aqueous solution of sodium boron hydride.

14. A process according to claim 13, wherein the concentration of said sodium boron hydride in the solution is in the range from 0.5 to 5% by weight.

15. A process according to claim 11, wherein said solution of said reducing agent is an aqueous solution of hydrazine.

16. A process according to claim 15, wherein the concentration of said hydrazine in the solution is in the range from 1.0 to 5% by weight.

17. A process according to claim 11, wherein said carrier is grains of γ-alumina.

* * * * *